United States Patent
Taylor et al.

(10) Patent No.: US 8,740,163 B1
(45) Date of Patent: *Jun. 3, 2014

(54) INSULATED CONNECTOR FOR ATTACHING A SOLAR UNIT TO A ROOF

(71) Applicants: Martin Taylor, Terryville, CT (US); Tamas Kovacs, Bristol, CT (US); Carrol Marston, Brooklyn, CT (US)

(72) Inventors: Martin Taylor, Terryville, CT (US); Tamas Kovacs, Bristol, CT (US); Carrol Marston, Brooklyn, CT (US)

(73) Assignee: Innovative Medical Products Inc., Plainville, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,101

(22) Filed: Oct. 31, 2012

(51) Int. Cl.
*A47G 29/02* (2006.01)
*F24J 2/52* (2006.01)

(52) U.S. Cl.
CPC .............. *F24J 2/5258* (2013.01); *F24J 2/5249* (2013.01)
USPC ....................... 248/237; 248/226.12; 52/173.3

(58) Field of Classification Search
CPC ............................... F24J 2/5258; F24J 2/5249
USPC ............. 52/173.3; 126/623; 248/237, 226.12, 248/906
See application file for complete search history.

(56) References Cited

U.S. PATENT DOCUMENTS

| | | | | |
|---|---|---|---|---|
| 1,911,384 A * | 5/1933 | Olson | 411/155 |
| 2,559,833 A * | 7/1951 | Stellin | 411/164 |
| 3,486,158 A * | 12/1969 | Soltysik et al. | 439/92 |
| 4,150,660 A * | 4/1979 | Peters et al. | 126/598 |
| 4,406,505 A * | 9/1983 | Avramovich | 439/97 |
| 5,121,583 A * | 6/1992 | Hirai et al. | 52/90.1 |
| 5,571,338 A * | 11/1996 | Kadonome et al. | 136/251 |
| 6,672,018 B2 * | 1/2004 | Shingleton | 52/173.3 |
| 7,435,134 B2 * | 10/2008 | Lenox | 439/567 |
| 7,435,897 B2 * | 10/2008 | Russell | 136/244 |
| 7,592,537 B1 * | 9/2009 | West | 136/251 |
| 7,600,349 B2 * | 10/2009 | Liebendorfer | 52/173.3 |
| 7,748,175 B2 * | 7/2010 | Liebendorfer | 52/173.3 |
| 7,758,011 B2 * | 7/2010 | Haddock | 248/500 |
| 7,780,472 B2 * | 8/2010 | Lenox | 439/567 |
| 7,956,280 B2 * | 6/2011 | Kobayashi | 136/251 |
| 7,987,641 B2 * | 8/2011 | Cinnamon | 52/173.3 |
| 8,156,697 B2 * | 4/2012 | Miros et al. | 52/173.3 |
| 8,181,402 B2 * | 5/2012 | Tsuzuki et al. | 52/173.3 |
| 8,266,848 B2 * | 9/2012 | Miros et al. | 52/173.3 |
| 8,475,185 B2 * | 7/2013 | Rivera et al. | 439/97 |
| 8,505,864 B1 * | 8/2013 | Taylor et al. | 248/237 |
| 8,572,909 B2 * | 11/2013 | Rivera et al. | 52/173.3 |
| 2003/0101662 A1 * | 6/2003 | Ullman | 52/27 |
| 2008/0010915 A1 * | 1/2008 | Liebendorfer | 52/173.3 |
| 2008/0245007 A1 * | 10/2008 | McDonald | 52/309.5 |
| 2008/0302928 A1 * | 12/2008 | Haddock | 248/205.1 |
| 2009/0250580 A1 * | 10/2009 | Strizki | 248/309.1 |
| 2010/0269430 A1 * | 10/2010 | Haddock | 52/173.3 |
| 2010/0276558 A1 * | 11/2010 | Faust et al. | 248/222.14 |
| 2010/0284737 A1 * | 11/2010 | McPheeters | 403/374.3 |
| 2011/0192098 A1 * | 8/2011 | Chung | 52/173.3 |
| 2011/0214365 A1 * | 9/2011 | Aftanas | 52/173.3 |
| 2011/0214366 A1 * | 9/2011 | Haddock et al. | 52/173.3 |
| 2011/0214367 A1 * | 9/2011 | Haddock et al. | 52/173.3 |
| 2011/0214368 A1 * | 9/2011 | Haddock et al. | 52/173.3 |
| 2011/0239546 A1 * | 10/2011 | Tsuzuki et al. | 52/11 |

(Continued)

*Primary Examiner* — William Gilbert
*Assistant Examiner* — James Ference

(57) ABSTRACT

An arrangement for attaching PV panels together and to a roofing clamp includes an electrical insulating provision between the attaching arrangement and the roofing clamp while providing electrical grounded connection between the PV panels, per se.

3 Claims, 4 Drawing Sheets

(56) References Cited

U.S. PATENT DOCUMENTS

| | | | |
|---|---|---|---|
| 2011/0271611 A1* | 11/2011 | Maracci et al. | 52/173.3 |
| 2012/0032045 A1* | 2/2012 | Lallier et al. | 248/237 |
| 2012/0244729 A1* | 9/2012 | Rivera et al. | 439/97 |
| 2012/0248271 A1* | 10/2012 | Zeilenga | 248/231.41 |
| 2012/0267490 A1* | 10/2012 | Haddock et al. | 248/221.11 |
| 2012/0299233 A1* | 11/2012 | Header | 269/91 |
| 2013/0091786 A1* | 4/2013 | DuPont et al. | 52/173.3 |
| 2013/0192150 A1* | 8/2013 | DuPont et al. | 52/173.3 |

* cited by examiner

INSULATED CONNECTOR FOR ATTACHING A SOLAR UNIT TO A ROOF

BACKGROUND OF THE INVENTION

Photovoltaic (PV) cells and panel assemblies are currently attached to roof seams for receiving solar energy and converting the solar energy to electricity for home use. One such PV panel assembly is a Mage Solar Unit manufactured by Mage Solar Inc.

In order to attach the PV panels to the roof seams, roofing clamps such as the AceClamp® manufactured by PMCI of Bristol Conn. for attaching snow guards and the like, can be modified for attaching the PV panels.

Another arrangement for attaching PV panels to roof seams is the type described within U.S. Pat. No. 7,758,011 entitled "Adjustable Mounting Assembly for Standing Seam Panels".

Such forms of attaching PV panels to roof seams mainly consist of an arrangement of metal components which insures electrical connection between adjoining panels that are attached by a common clamp for grounding purposes.

When such PV panels are to be attached to metal roofs, it is important that the panels remain electrically grounded without becoming electrically connected with the clamp and/or the metal roof.

One purpose of the instant invention is to describe a PV panel clamp for attaching a PV panel to a roof without electrical conduction between the clamp and roof while insuring electrical grounding between adjoining PV panels, per se.

A current arrangement for such insulating assembly is described within U.S. patent application Ser. No. 13/385,644 entitled "PV Kit for Roof Assembly", which Application is incorporated herein for purposes of reference.

A further purpose of the instant invention is to provide a simpler and less expensive insulating assembly for achieving the same results.

SUMMARY OF THE INVENTION

An insulated connector for attaching a pair of adjoining PV panels together, and to a roofing clamp, includes a dual function washer to insure electrical insulation between the connector and the roofing clamp while providing electrical grounded connection between the adjoining panels.

DESCRIPTION OF THE PREFERRED EMBODIMENT

Figure 1:
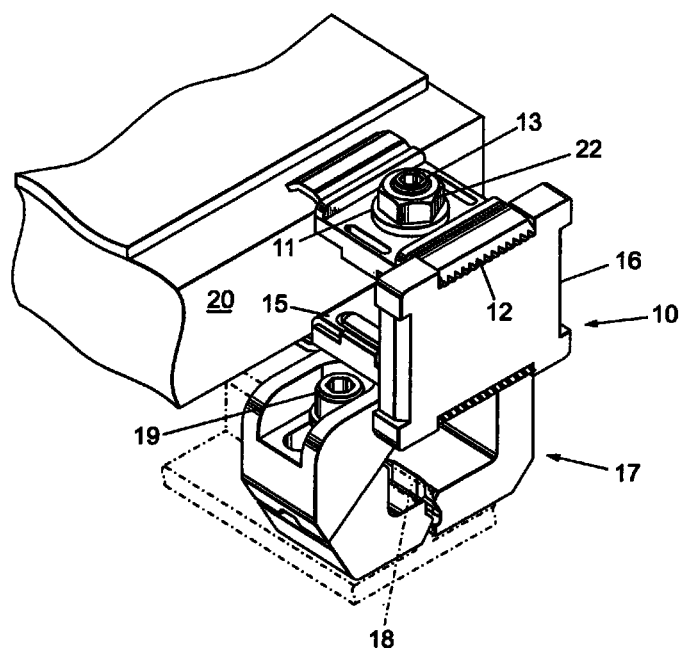
FIG. 1 is a front perspective view of the PV insulating kit according to the prior art connecting with the associated PV panel and associated roofing clamp.

As now shown in FIG. 1 the PV kit, according to the Prior Art Application described earlier, includes a PV kit assembly 10 with an end PV panel 20 captured between one side of the top wing-shaped metal plate 12 and one side of the bottom wing-shaped metal plate 15 and with the plastic side piece 16 captured between an opposite side of the top metal plate and an opposite side of the bottom metal plate.

An upper insulating washer 11 and a lower insulating washer (not shown) are captured within the top and bottom metal plates 12, 15, to prevent electrical connection between the top and bottom metal plates, the rod 13, nut 22 as well between the roofing clamp 17 and associated roofing seam 18 and roofing seam nut 19.

Figure 2:
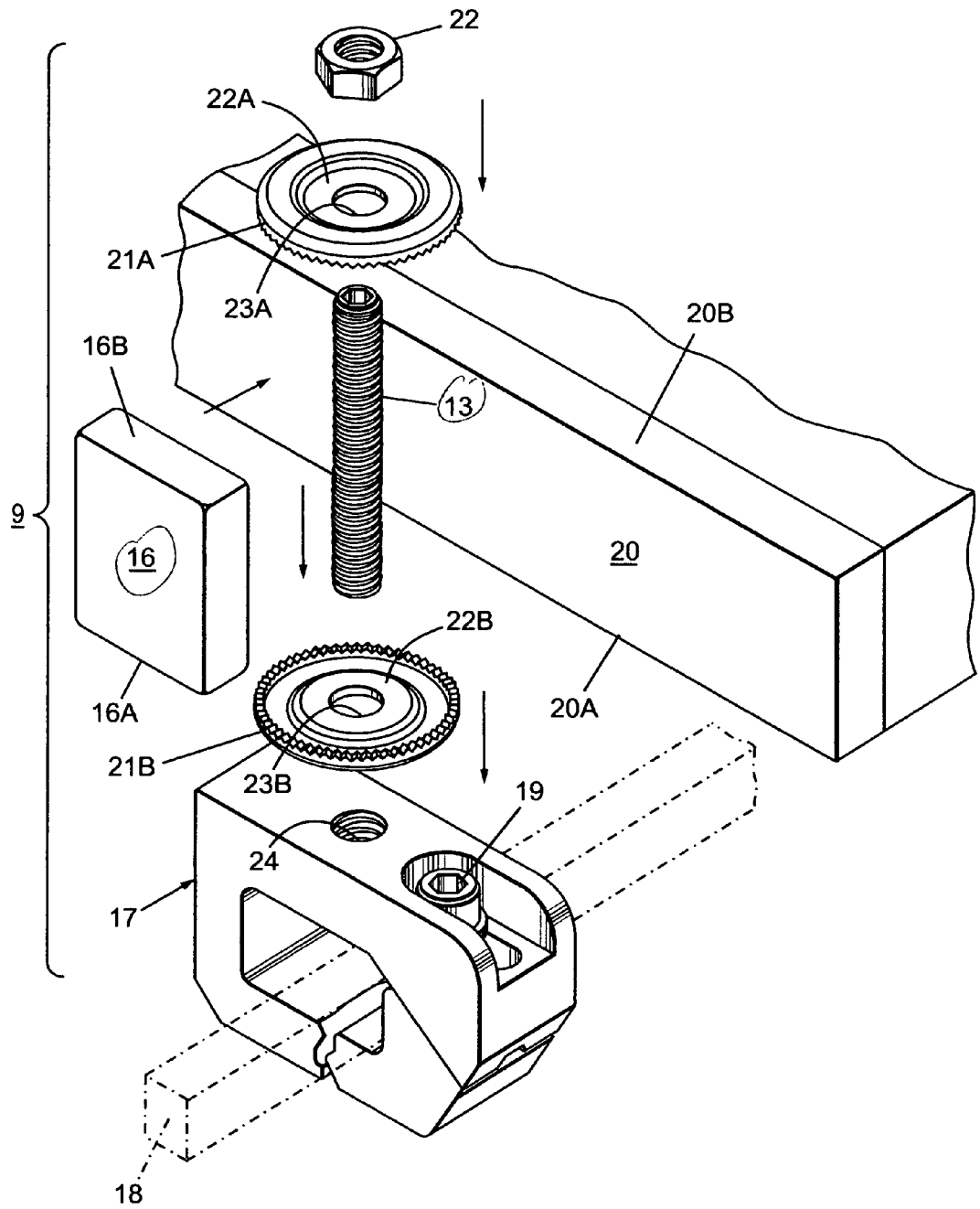
FIG. 2 is a front perspective view of the components of the insulated connector of the invention prior to assembly of an end PV panel with a roofing seam via the associated roofing clamp.

The insulated connector arrangement 9, according to the invention, for attaching an end pv panel 20 to the roof seam 18 via the roofing clamp 17 is depicted in FIG. 2.

In lieu of the top and bottom wing-shaped metal plates 12, 15 and associated insulated washers 11, as shown in FIG. 1, a serrated top metal ring 21A including an in-set top plastic insulating cylinder 22A and a bottom metal ring 21B including an in-set bottom plastic insulating cylinder 22B are arranged on opposing sides of the plastic side plate 16 and PV panel 20 and over the roof clamp 17, which is attached to the roof seam 18 via nut 19.

The elongated threaded rod 13 is first inserted thru the opening 23B in the bottom insulating washer 22B and then fastened within threaded opening 24 in the roofing clamp 17.

The bottom 16A of the plastic side plate 16 and the bottom 20A of the panel 20 are next positioned on opposing sides of the bottom metal ring 21B and the top metal ring 21A is inserted onto the elongated threaded rod 13 via opening 23A allowing the top metal ring to become positioned on the top 20B, as shown in FIG. 2 of the PV panel 20 and the top 16B of the plastic side plate 16.

Figure 3:
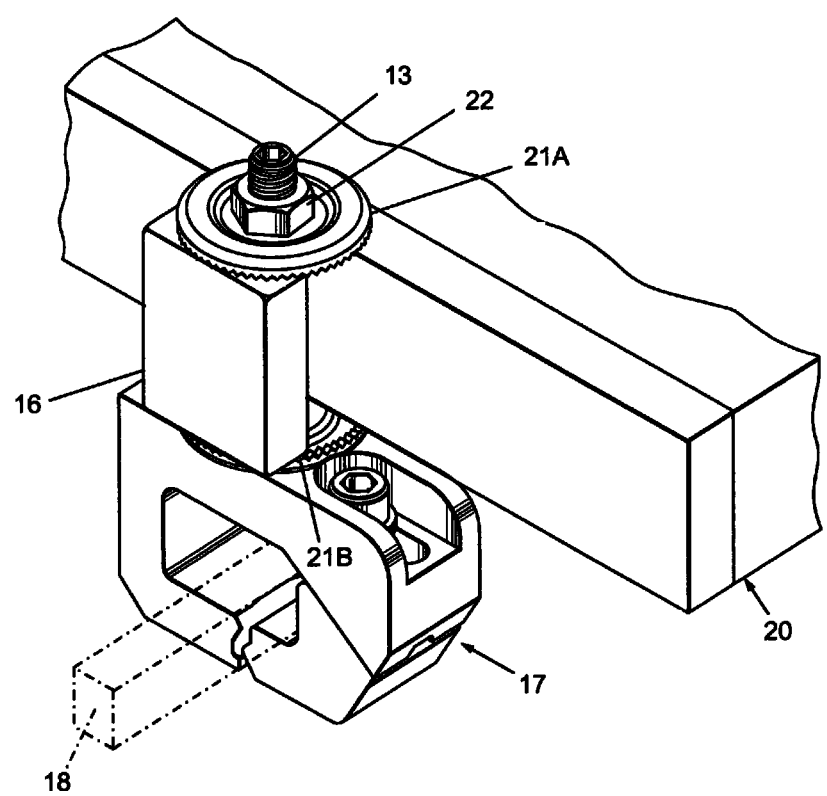
FIG. 3 is a front perspective view of the insulated connector of the invention connecting between an end PV panel and a roofing seam via the associated roofing clamp.

The associated nut 22 is then engaged with the elongated threaded rod 13 to fasten the PV panel 20 and the plastic side plate 16 to the roofing clamp 17 and roof seam 18 to complete the assembly as shown in FIG. 3.

Figure 4:
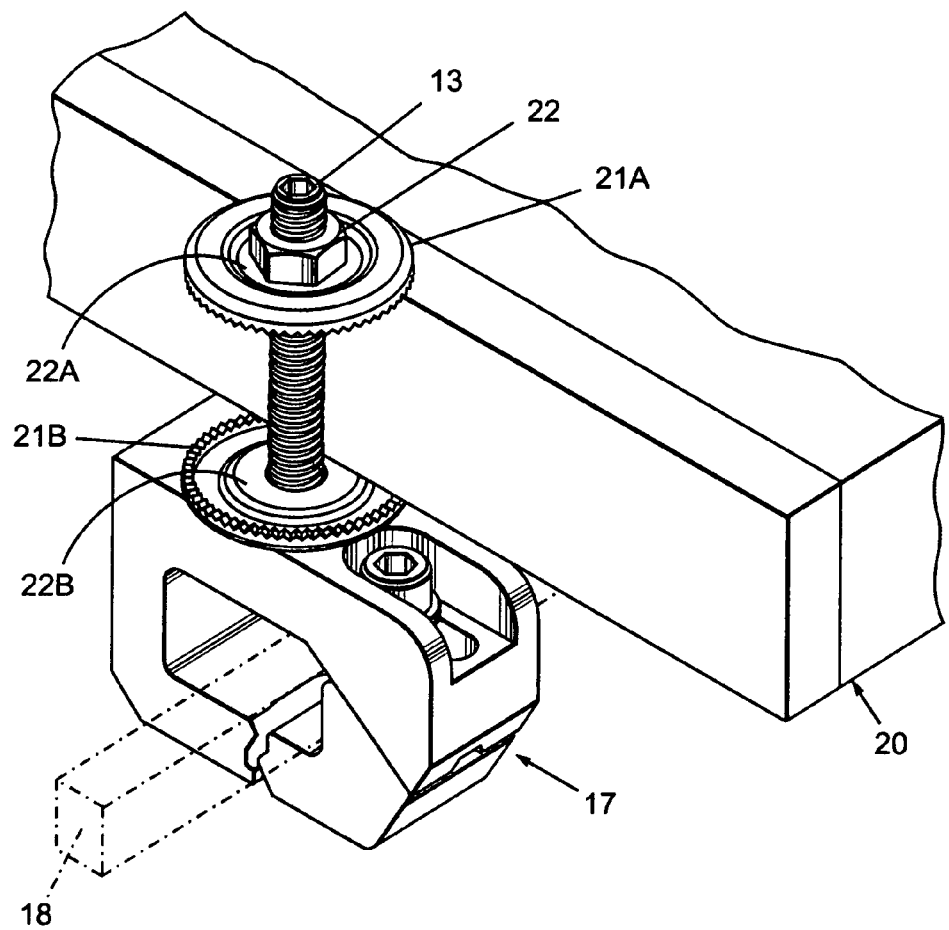
FIG. 4 is a front perspective view of the insulated connector of the invention connecting between an intermediate PV panel and a roofing seam via the associated roofing clamp.

When a pair of intermediate PV panels is to be mechanically and electrically interconnected, the arrangement depicted in FIG. 4 is now employed.

Although a pair of such intermediate PV panels are to be interconnected, only one intermediate PV panel 20 is depicted herein for purposes of clarity.

One PV panel 20 of the intermediate pv panels is captured between one side of the top and bottom metal rings 21A, 21B to attach the intermediate PV panels 20 to the roofing seam 18 and to maintain electrical grounded connection between the intermediate PV panels 20 via upper metal ring 21A, in the manner described earlier, whereby the top and bottom plastic insulating cylinders 22A, 22B insure electric insulation between the elongated threaded rod 13, associated nut 22 and roofing clamp 17 to prevent electrical connection with the associated roof seam 18, which is an important feature of the invention.

An insulated connector for attaching PV panels and the like to roofing seams has herein been described along with means for allowing electrical grounded contact between adjoining PV panels without allowing electrical connection between the panels and the associated roof.

What is claimed is:

1. An arrangement for attaching PV panels to a roof comprising:
   a threaded rod;
   a top serrated metal ring at one end of said rod, said top metal ring including a top electrically insulating cylinder and being arranged for contact with a top part of a PV panel; and a bottom serrated metal ring at an opposite end of said rod, said bottom metal ring including a bottom electrically insulating cylinder and being arranged for contact with a bottom part of said PV panel, said opposite end of said rod being arranged for engaging a roofing clamp on a roof seam with no electrical contact between said PV panel and said roof seam, said top and bottom electrically insulating cylinders are arranged within said top and bottom serrated metal rings.

2. The arrangement of claim 1 wherein said top metal ring is arranged for contact with a top part of a plastic side plate adjacent said PV panel and said bottom metal ring is arranged for contact with a bottom part of said plastic side plate.

3. The arrangement of claim 1 wherein said top and bottom electrically insulating cylinders each include an opening for receiving said threaded rod for providing electrical insulation between said top and bottom serrated metal rings and said threaded rod.

* * * * *